United States Patent [19]
Onishi et al.

[11] Patent Number: 5,667,720
[45] Date of Patent: Sep. 16, 1997

[54] LIQUID CRYSTAL DISPLAY DEVICE AND A METHOD FOR PRODUCING THE SAME

[75] Inventors: Noriaki Onishi, Osaka; Shuichi Kohzaki, Nara, both of Japan

[73] Assignee: Sharp Kabushiki Kaisha, Japan

[21] Appl. No.: 641,776

[22] Filed: Apr. 30, 1996

Related U.S. Application Data

[63] Continuation of Ser. No. 179,963, Jan. 11, 1994, abandoned.

[30] Foreign Application Priority Data

Jan. 14, 1993 [JP] Japan .................. 5-005347

[51] Int. Cl.$^6$ .............. C09K 19/52; F21V 9/00; G02F 1/133
[52] U.S. Cl. .................. 252/299.01; 252/582
[58] Field of Search ............... 252/299.01, 582; 349/182

[56] References Cited

U.S. PATENT DOCUMENTS

| | | | |
|---|---|---|---|
| 4,596,445 | 6/1986 | Fergason | 359/52 X |
| 4,662,720 | 5/1987 | Fergason | 359/52 X |
| 5,087,387 | 2/1992 | Mullen | 252/299.5 |
| 5,093,471 | 3/1992 | West | 528/418 |
| 5,116,528 | 5/1992 | Mullen et al. | 252/299.5 |
| 5,240,636 | 8/1993 | Doane et al. | 252/299.01 |
| 5,242,616 | 9/1993 | Finkenzeller et al. | 252/299.01 |
| 5,323,251 | 6/1994 | Coates et al. | 359/51 |
| 5,354,498 | 10/1994 | Akashi et al. | 252/299.01 |

FOREIGN PATENT DOCUMENTS

| | | |
|---|---|---|
| 58-501631 | 9/1983 | Japan . |
| 59-226322 | 12/1984 | Japan . |
| 61-502128 | 9/1986 | Japan . |
| 2-153318 | 6/1990 | Japan . |
| WO83/01016 | 3/1983 | WIPO . |
| WO85/04262 | 9/1985 | WIPO . |

OTHER PUBLICATIONS

Ito et al, "Chemical Amplification in the Design of Dry Developing Resist Materials", Polymer Engineering and Science, vol. 23, No. 18, Dec. 1983.

Endo et al, "Helical Pitch of Ferroelectric Liquid–Crystalline Polymers and Copolymers", Liquid Crystals, vol. 9, No. 5, (1991), pp. 635–641.

Kajiyama, "Construction and Function of Polymer/Liquid-–Crystal Composite Film", Preprints of 16th Symposium on Liquid Crystals, Hiroshima, Japan, pp. 146–149 (1990).

*Primary Examiner*—C. H. Kelly
*Attorney, Agent, or Firm*—Nixon & Vanderhye

[57] ABSTRACT

A liquid crystal display device according to the present invention includes a pair of opposing substrates and polymer dispersed liquid crystal interposed between the pair of opposing substrates, the polymer dispersed liquid crystal including a polymer matrix and a plurality of liquid crystal droplets partitioned by the polymer matrix. The polymer matrix and the plurality of liquid crystal droplets are formed by applying light and/or heat to a polymer dispersed liquid crystal precursor in which a polymer for forming the polymer matrix and liquid crystal molecules for forming the liquid crystal droplets are combined via a combining group, the combining group being cleaved by the application of light and/or heat.

16 Claims, 6 Drawing Sheets

LIQUID CRYSTAL DISPLAY DEVICE AND A METHOD FOR PRODUCING THE SAME

This is a continuation of application Ser. No. 08/179,963, filed Jan. 11, 1994, now abandoned.

BACKGROUND OF THE INVENTION

1. Field of the Invention

The present invention relates to a liquid crystal display device and a method for the production the same. More particularly, the present invention relates to a polymer dispersed liquid crystal display device utilizing a liquid crystal-polymer composite film in which liquid crystal droplets are partitioned by a matrix composed of polymer material.

2. Description of the Related Art

Liquid crystal display devices are used in a broad range of products such as projection-type display devices, direct-view type display devices, display panels, and windows with shutter functions. There are a variety of display modes applicable to liquid crystal display devices, as is described below:

There have been realized display devices of a TN (Twisted Nematic) mode or an STN (Super Twisted Nematic) mode, as display devices utilizing electrooptical effects. Both display modes use nematic liquid crystal. A display mode using FLC (Ferroelectric Liquid Crystal) has also been proposed. However, there display modes, since they require a polarizing plates, have the problem of low utilization efficiency of light. Moreover, these display modes require an aligning film and an orientation treatment in order to align the liquid crystal molecules.

Display modes which do not require any polarizing plates are, for example, a DS (Dynamic Scattering) mode and a PC (Phase Change) mode. However, these display modes have the problem of low contrast.

There have been proposed polymer dispersed liquid crystal display devices as display devices which require neither a polarizing plate nor an orientation treatment of the liquid crystal. The configuration of a polymer dispersed display device is such that a liquid crystal-polymer composite film in which liquid crystal droplets are partitioned by a matrix composed of polymer material (hereinafter, such a liquid crystal-polymer composite film is referred to as a 'polymer dispersed liquid crystal') is interposed between two opposing substrates.

Operating principles for polymer dispersed liquid crystal display devices are briefly described below:

When no voltage is applied, liquid crystal molecules within each liquid crystal droplet dispersed in the polymer matrix are in a random orientation state. Since liquid crystal molecules have birefringence, there arises intense scattering of light due to ununiformity of refractive indices within the liquid crystal droplets and difference between the refractive index of the polymer matrix and that of the liquid crystal. Because of the light scattering, the polymer dispersed liquid crystal display device does not transmit any light when voltage is not applied. That is, the display device is in an opaque state.

On the other hand, when a voltage is applied, liquid crystal molecules having positive dielectric anisotropy are oriented in such a way that the longitudinal axes thereof are in parallel to an applied electric field. Therefore, by using materials such that an ordinary refractive index of the liquid crystal molecules having positive dielectric anisotropy is identical with the refractive index of the polymer matrix, it becomes possible to obtain a light scattering state when no voltage is applied, and a transparent state when a voltage is applied. In other words, a polymer dispersed liquid crystal display device conducts display by controlling the amount of light to be transmitted rather than electrically controlling the intensity of light scattering.

The followings are examples of conventional methods for fabricating the above-mentioned polymer dispersed liquid crystal display devices:

(1) A method disclosed in Japanese National Publication No. 58-501631: Polymer capsules containing liquid crystal droplets are formed in the interspace between two opposing substrates. This method is a so-called polymerization induced phase separation method.

(2) A method disclosed in Japanese National Publication No. 61-502128: A PDLC (Polymer Dispersed Liquid Crystal) precursor as a mixture of liquid crystal material, a photocurable polymer, and a thermosetting polymer is sealed between a pair of opposing substrates, whereby liquid crystal droplets partitioned by a polymer matrix are formed.

(3) A method disclosed in Japanese Laid-Open Patent Publication No. 59-226322: A solution (PDLC precursor solution) of polymer material and liquid crystal material in a solvent which can dissolve both materials is applied on one of a pair of substrates and is dried so as to remove the solvent. Thereafter, the other substrate is applied to the said substrate.

However, a polymer dispersed liquid crystal display device fabricated by any of the above-mentioned conventional methods has the problem that unreacted polymer material may dissolve into the liquid crystal and/or that liquid crystal may dissolve into the polymer matrix. Therefore, the resultant polymer dispersed liquid crystal display device has the problem of high threshold voltage (as one of various electrooptical characteristics of the display device), thus deteriorating the display characteristics of the display device. Moreover, there is another problem that heating such a polymer dispersed liquid crystal display device would further promote such mutual elution, or mingling, of the polymer matrix and the liquid crystal phase. As a result, the electrooptical properties, such as threshold voltage, of the display device would deteriorate.

As for a guest-host type polymer dispersed liquid crystal display device fabricated according to a conventional method, there is a problem that dye molecules dissolve into the polymer matrix, thus lowering the contrast of the display device.

The above-mentioned problems are most prominant in cases where a polymer dispersed liquid crystal display device fabricated according to a conventional method is applied to a projection-type liquid crystal display device or a transmissive liquid crystal display device provided with a backlight. In these display devices, heating effects due to emission of light by a light source such as a metal halide lamp, a cold-cathode tube, an EL (Electroluminiscent) film, and the like prompt the above-mentioned problem of mutual elution, that is, elution of unreacted polymer material into the liquid crystal and elution of the liquid crystal into the polymer matrix. As a result, the display characteristics of the polymer dispersed liquid crystal display device are greatly deteriorated.

In cases where a polymer dispersed liquid crystal display device is fabricated by a photopolymerization induced phase separation method in which UV-rays (Ultra Violet rays) are used, a problem arises that the UV-rays used in the fabrication of the display device deteriorate the liquid crystal molecules, resulting in a polymer dispersed liquid crystal display device with poor electrooptical properties.

Moreover, according to a conventional method for fabricating a polymer dispersed liquid crystal display device, it is difficult to form the liquid crystal droplets in uniform size and shape. As a result, a conventional polymer dispersed liquid crystal display device has a problem that the steepness of electrooptical characteristics (voltage-light transmittance characteristics) is inadequate.

SUMMARY OF THE INVENTION

A liquid crystal display device according to the present invention comprises a pair of opposing substrates and polymer dispersed liquid crystal interposed between the pair of opposing substrates, the polymer dispersed liquid crystal including a polymer matrix and a plurality of liquid crystal droplets partitioned by the polymer matrix, wherein the polymer matrix and the plurality of liquid crystal droplets are formed by applying light and/or heat to a polymer dispersed liquid crystal precursor in which a polymer for forming the polymer matrix and liquid crystal molecules for forming the liquid crystal droplets are combined via a combining group, the combining group being cleaved by the application of light and/or heat.

In one embodiment of the invention, the polymer dispersed liquid crystal includes a plurality of liquid crystal domains, each liquid crystal domain being composed essentially of some of the plurality of liquid crystal droplets.

In another embodiment of the invention, such liquid crystal domain is in contact with both of the pair of opposing substrates.

In still another embodiment of the invention, the liquid crystal display device further comprises a plurality of electrodes disposed in a matrix shape on a face of one of the pair of opposing substrates, the face being in contact with the polymer dispersed liquid crystal, wherein at least one of the liquid crystal domains accounts for 30% or more of the area of each of 70% or more of the pixel electrodes.

In still another embodiment of the invention, an aligning film is formed on at least one face of the pair of opposing substrates, the face being in contact with the polymer dispersed liquid crystal.

In still another embodiment of the invention, the liquid crystal droplets include at least one dichroic dye having a dichroic ratio or 4 or more.

In still another embodiment of the invention, the liquid crystal droplets include at least one functional group capable of color expression, the at least one functional group being isomerized by applying light and/or heat thereto.

In another aspect of the present invention, there is provided a method for producing a liquid crystal display comprising a pair of opposing substrates and polymer dispersed liquid crystal interposed between the pair of opposing substrates, the polymer dispersed liquid crystal including a polymer matrix and a plurality of liquid crystal droplets partitioned by the polymer matrix, wherein the method comprises the steps of: forming a polymer dispersed liquid crystal precursor in which a polymer for forming the polymer matrix and liquid crystal molecules for forming the liquid crystal droplets are combined via a combining group cleavable by the application of light and/or heat on one of the pair of opposing substrates; attaching the other one of the pair of opposing substrates to the polymer dispersed liquid crystal precursor formed on the one substrate; and cleaving the combining group by applying light and/or heat to the polymer dispersed liquid crystal precursor.

Alternatively, according to the present invention, there is provided a method for producing a liquid crystal display device comprising a pair of opposing substrates and polymer dispersed liquid crystal interposed between the pair of opposing substrates, the polymer dispersed liquid crystal including a polymer matrix and a plurality of liquid crystal droplets partitioned by the polymer matrix, wherein the method comprises the steps of: forming a polymer dispersed liquid crystal precursor in which a polymer for forming the polymer matrix and liquid crystal molecules for forming the liquid crystal droplets are combined via a combining group cleavable by the application of light and/or heat on one of the pair of opposing substrates; attaching the other one of the pair of opposing substrates to the polymer dispersed liquid crystal precursor formed on the one substrate; and irradiating portions of the polymer dispersed liquid crystal with light, the combining group present in irradiated portions of the polymer dispersed liquid crystal precursor being cleaved by the irradiation.

In one embodiment of the invention, the method further comprises a step of heating the polymer dispersed liquid crystal precursor after the step of irradiation with light, the combining group present in non-irradiated portions of the polymer dispersed liquid crystal precursor being cleaved by the heating.

In another embodiment of the invention, the step of irradiation with light is a step of controlling the irradiated portions of the polymer dispersed liquid crystal precursor by means of a photomask.

In still another embodiment of the invention, the method further comprises a step of forming a plurality of electrodes disposed in a matrix shape on a face of one of the pair of opposing substrates, the face being in contact with the polymer dispersed liquid crystal, wherein a total area of openings of the photomask accounts for more than 40% of a total area of the plurality of pixel electrodes.

In still another embodiment of the invention, the method further comprises a step of forming an aligning film on at least one of faces of the pair of opposing substrates, the faces being in contact with the polymer dispersed liquid crystal.

In still another embodiment of the invention, the polymer dispersed liquid crystal precursor further includes a dichroic dye via a combining group cleavable by applying light and/or heat thereto, the dichroic dye having a dichroic ration of 4 or more.

In still another embodiment of the invention, the polymer dispersed light crystal precursor further includes, via a combining group cleavable by applying light and/or heat thereto, a liquid crystalline functional group and a functional group capable of color expression and isomerizable by applying light and/or heat thereto.

In still another embodiment of the invention, the light used in the step of irradiation is 200 mJ/$cm^2$ or less in amount.

Thus, the invention described herein makes possible the advantages of (1) providing a liquid crystal display device having excellent display characteristics and heat resistance, and (2) a method for fabrication thereof.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
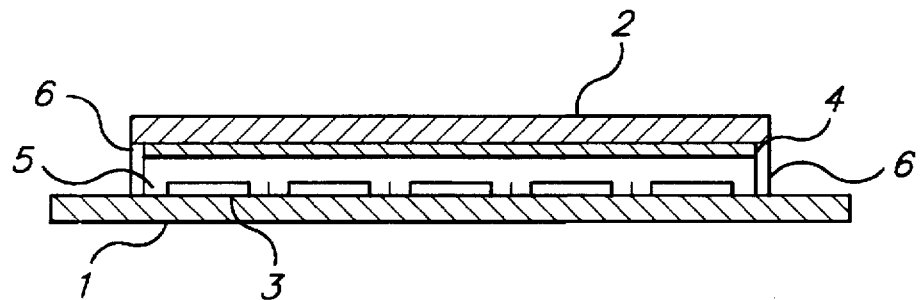
FIG. 1 is a sectional view showing a liquid crystal display device according to a first example of the present invention.
Figure 2:
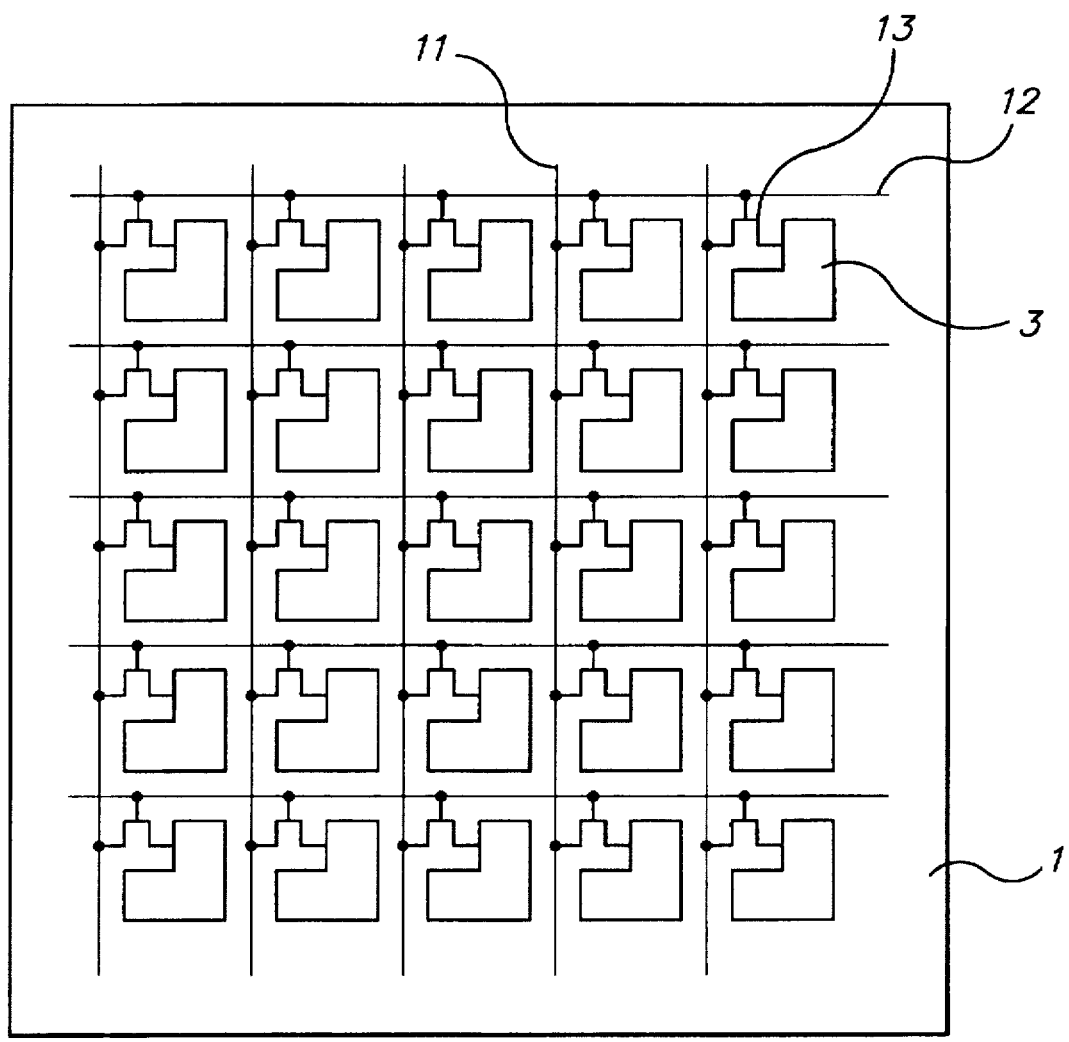
FIG. 2 is a plan view showing the liquid crystal display device shown in FIG. 1.

FIG. 1 is a sectional view showing a liquid crystal display device according to the present example. FIG. 2 is a plan view showing the liquid crystal display device. The liquid crystal display includes a pair of substrates 1 and 2 and a polymer dispersed liquid crystal layer (hereinafter referred to as "PDLC" layer) 5 interposed between the substrates 1 and 2. The substrates 1 and 2 are composed of material such as glass having no birefringence. The PDLC layer 5 includes liquid crystal droplets which are partitioned by a polymer matrix. The PDLC layer 5 is sealed by a sealing agent 6 disposed between the pair of substrates 1 and 2. The sealing agent 6 is composed of epoxy resin or the like.

On a face of the substrate 1 that opposes the substrate 2, a plurality of signal lines 11 and a plurality of scanning lines 12 are formed in such a way that each signal line 11 intersects the scanning lines 12. In each of the areas (pixels) surrounded by the signal lines 11 and the scanning lines 12, a pixel electrode 3 is formed. A switching element 13 is connected to the signal line 11, scanning line 12 and pixel electrode 3 corresponding to each pixel. The switching element 13 can be formed using an a-Si (amorphous Silicon) TFT (This Film Transistor), or the like. The pixel electrodes 3 are disposed in a matrix shape. Driving systems such as an active matrix driving system and a simple matrix driving system may be used for this liquid crystal display device.

On a face of the substrate 2 that opposes the substrate 1, a counter electrode 4 is disposed so as to oppose all the pixel electrodes 3. A pixel capacity is formed in a portion where each pixel electrode 3 and the counter electrode 4 opposes each other. The substrates 1 and 2 may be formed of plastic substrates or the like in order to decrease the weight and production cost thereof.

Hereinafter, a method for producing the liquid crystal display device according to the present example will be described.

First, p-hydroxystyrene and 1-bromo-4-butanol are reacted under the presence of potassium, and the resultant material is purified. This purified material and a low molecular weight liquid crystalline compound (x) represented by Formula I (shown below) are esterified under basic conditions and are purified by column chromatography to give a polymerizable compound (A) represented by Formula II (shown below) in which a liquid crystalline functional group is combined with a hydroxyl group of p-hydroxystyrene via a combining group. The low molecular weight liquid crystalline compound (X) represented by Formula I can be obtained by a method disclosed in Japanese National Publication No. 3-505742.

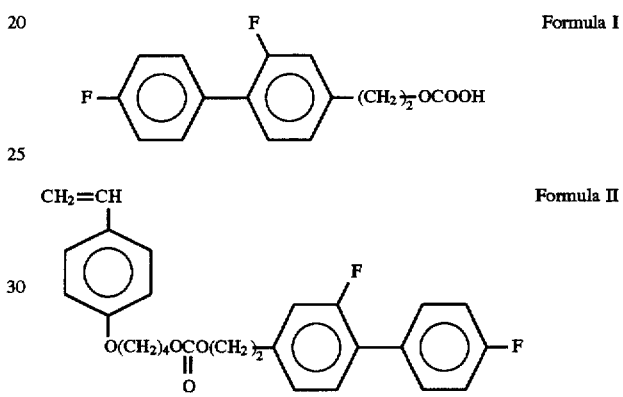

In the above Formula II, the liquid crystalline functional group is of an alkylbiphenyl structure. The carboalkoxy group serving as the combining group cleaves by applying light and/or heat thereto.

Next, the polymerizable compound (A) thus obtained is reacted with benzoylperoxide (BPO), which is a polymerization initiator, for six hours in toluene at 100° C. The resultant material is repeatedly subjected to a precipitation process in methanol to remove low molecular weight compounds. Thus, a polymer (B) in which the liquid crystalline functional group is combined with the main chain via a combining group is obtained, which is represented by the following Formula III:

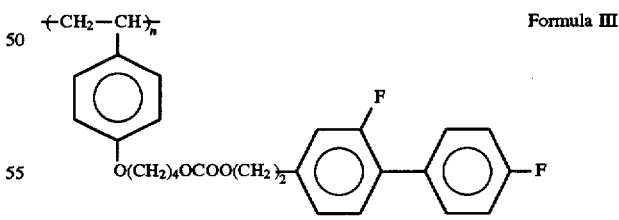

Subsequently, a 15% solution of the polymer (B) in chloroform is prepared. To this solution, a light-induced acid generating agent such as triphenyl sulfonium triflate ($Ph_3SOTf$) is added as a catalyst at a weight ratio of 5% against the whole solution. Thus, a PDLC precursor solution is obtained.

Then, the PDLC precursor solution is applied on the substrate 1, on which the pixel electrode 3 have been formed, by a bar coating method and is dried to form a PDLC precursor film having a thickness of 12 μm. In the present example, the substrate 1, as well as the substrate 2, is composed of a glass substrate (manufactured by: Nippon sheet Glass Co., Ltd.) on which an ITO (Indium Tin Oxide) film having a thickness of 50 nm is formed.

Then, the substrate 2, on which the counter electrode 4 has been formed, is attached to the substrate 1, on which the PDLC precursor film has been formed, in such a way that the counter electrode 4 opposes the substrate 1. The resultant composite is sealed with the sealing agent 6 to form a liquid crystal panel.

The above-mentioned liquid crystal panel is irradiated with UV-rays (50 mJ/cm$^2$) by using a high-pressure mercury lamp and thereafter is heated for 20 minutes at 80° C. Thus, the combining group included in the PDLC precursor film cleaves, whereby the liquid crystalline functional group is separated from the polymer (B). In other words, the polymer and the liquid crystal are separated by applying light and heat thereto.

Figure 10:
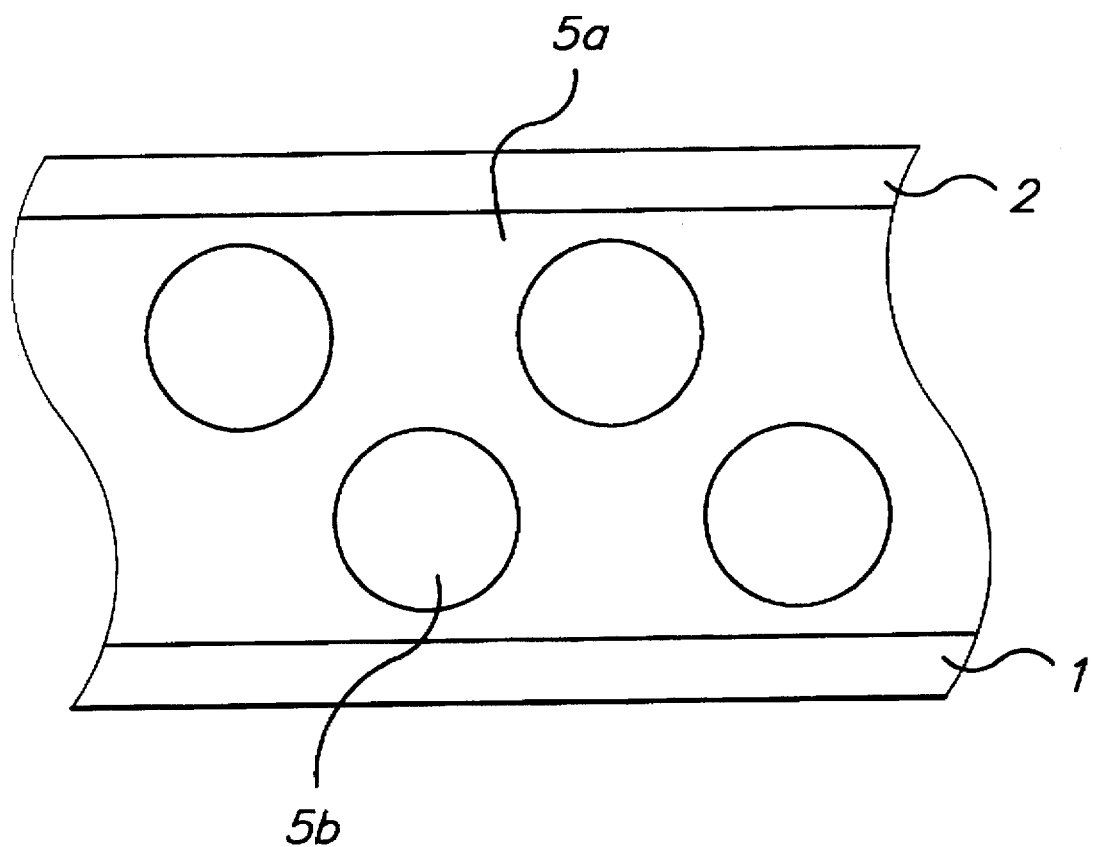
FIG. 10 is a sectional view showing polymer dispersed liquid crystal formed in a liquid crystal display device according to a first example of the present invention.

FIG. 10 shows a cross section of a PDLC layer of the liquid crystal display device of the present example. By the above-described process, the PDLC layer 5 is obtained as a layer in which liquid crystal droplets 5b composed of the liquid crystalline functional group are partitioned by a polymer matrix 5a composed of the polymer consisting of the polymer (B) excluding the liquid crystalline functional group. The PDLC layer 5 is formed in an interspace between the substrates 1 and 2. Progress of the above-mentioned cleavage reaction was consecutively monitored by examining the increase in the intensity ration of the hydroxyl group in an IR (Infrared) spectrum. No increase in the intensity ratio of the hydroxy group was observed even after subjecting the above-mentioned liquid crystal panel to another heat treatment in addition to the above-described heat treatment.

Moreover, a phase transition temperature $T_{NI}$ between a nematic liquid crystal phase and an isotropic liquid phase was measured by observing with a polarizing microscope and by DSC (Differential Scanning Calorimetry). The measured phase temperature $T_{NI}$ was about 70° C. Evaluation results of electrooptical properties of the display device will be described later as well as those of the other examples of the present invention and comparative examples.

Figure 8:
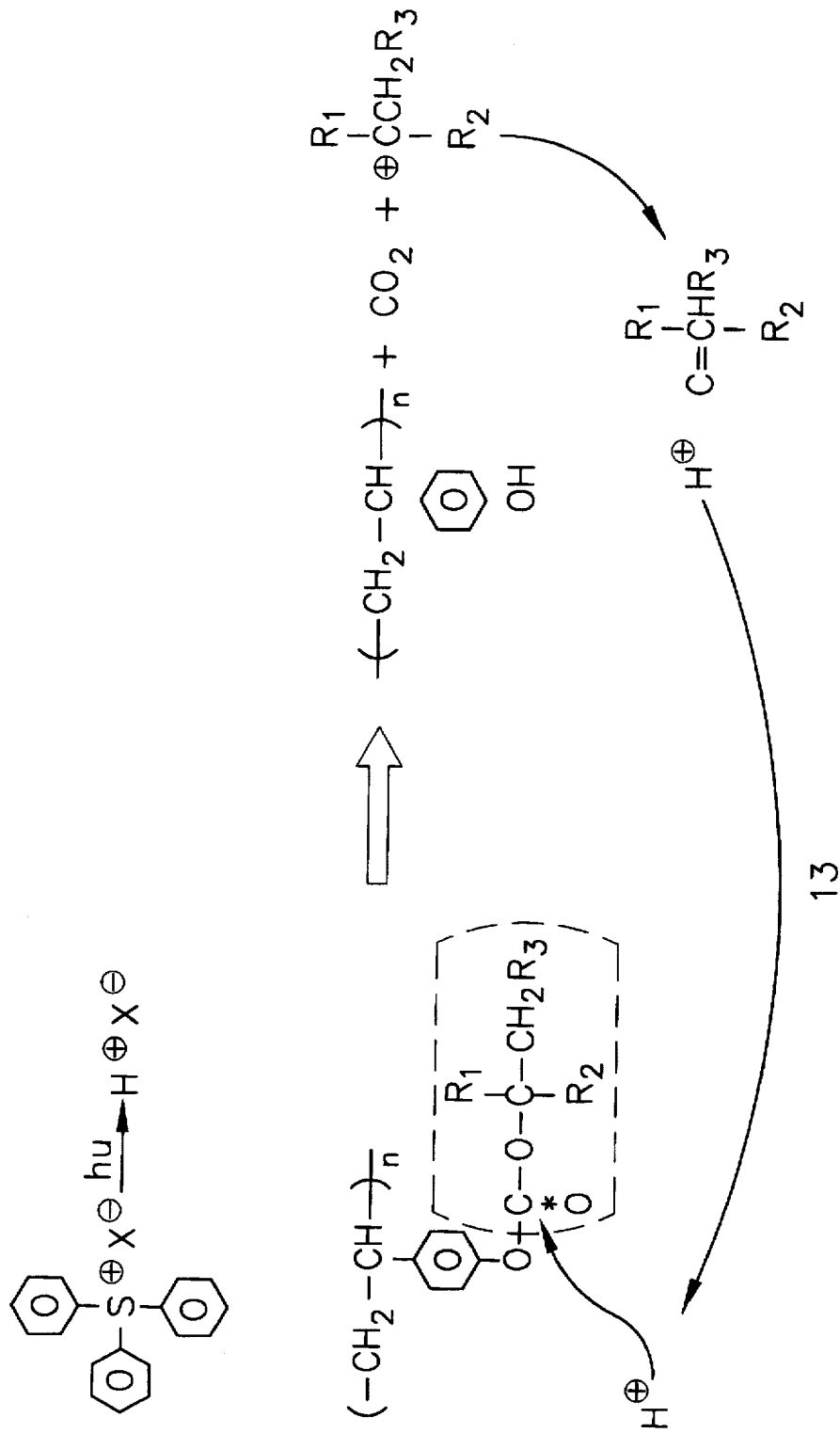
FIG. 8 shows an example of a cleavage reaction by a chemical amplification process used in a fabrication method for a polymer dispersed liquid crystal display device according to the present invention.

As is described above, in the present example, light and heat are applied to the polymer (B), in which the liquid crystalline functional group is combined via the combination group, so that the combining group cleaves. Thus, the PDLC layer 5, in which the liquid crystal and the polymer have phase separated, is obtained. The above-mentioned cleavage reaction should preferably be conducted by a chemical sensitizing process (of. Polym. Eng. Sci., 23 [18], 1012 (1983), etc.), which is applied to fabrication of a high sensitivity resist. FIG. 8 shows an example of cleavage process according to this method. An acid is produced as a result of the irradiation with light, and acts as a catalyst in a cleavage reaction. Therefore, by subjecting the liquid crystal panel to a heat treatment following the light irradiation, the cleavage reaction is enhanced in the irradiated portions. On the other hand, no cleavage reaction takes place in the non-irradiated portions.

As is seen from the present example, according to the fabrication method for a liquid crystal display device of the present example, the light amount of UV-rays required for the formation of the PDLC layer is 100 mJ/cm$^2$ or less. This is remarkably small as compared with the conventional UV-ray light amount of 1 J/cm$^2$ required for the formation of a PDLC layer by a photopolymerization induced phase separation method. Therefore, the problem of poor display characteristics due to deterioration of the liquid crystal molecules by UV-ray irradiation is substantially solved. The light amount of the UV-rays to be used in the fabrication method according to the present example should preferably be in the range of 30 mJ/cm$^2$ to 200 mJ/cm$^2$, and more preferably be in the range of 50 mJ/cm$^2$ to 100 mJ/cm$^2$. If the light amount is less than 30 mJ/cm$^2$, the cleavage reaction does not progress sufficiently. If the light amount is more than 200 mJ/cm$^2$, on the other hand, the liquid crystal molecules deteriorate, whereby display characteristics deteriorate owing to a decrease in resistivity, as in the case of a conventional fabrication method for a liquid crystal display device.

Moreover, the PDLC precursor film according to the fabrication method of the present example does not contain any low molecular weight compounds besides the polymerization initiator. Therefore, the problem of deterioration of display characteristics and heat resistance due to dissolution of unreacted low molecular weight compounds into liquid crystal droplets and dissolution of liquid crystal molecules into the polymer matrix, as associated with a conventional polymerization induced phase separation method, is reduced.

EXAMPLE 2

The present example relates to a liquid crystal display device in which a dichroic dye is used, and a fabrication method for such a liquid crystal display device. More specifically, the present example relates to a liquid crystal display device utilizing a polymer in which a functional group having dichroic properties (hereinafter referred to as a 'dichroic functional group') has been introduced to side chains as well as liquid crystalline functional group, and a fabrication method for such a liquid crystal display device.

The liquid crystal display device of the present example is fabricated in the following manner:

A compound (Y) containing a dichroic functional group at an end of each molecule (represented by Formula IV shown below: p-ω-hydroxypropyloxy-p'-nitroazobenzen) and acrylic acid chloride are esterified under basic conditions. Thereafter, the resultant material is purified by column chromatography to give a polymerizable compound (C) represented by Formula V (shown below) having a dichroic functional group at an end of each molecule:

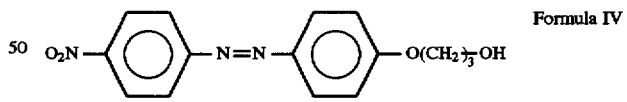

Formula IV

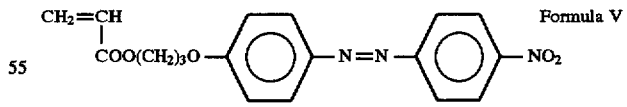

Formula V

Next, the polymerizable compound (C) is reacted with the polymerizable compound (A) having the liquid crystalline functional group as used in Example 1 and benzoylperoxide (BPO), which is a polymerization initiator, for six hours in toluene at 100° C. The resultant material is repeatedly subjected to a precipitation process in methanol to remove low molecular weight compounds. Thus, a polymer (D) having the liquid crystalline functional group and the dichroic functional group is obtained which is represented by the following Formula VI:

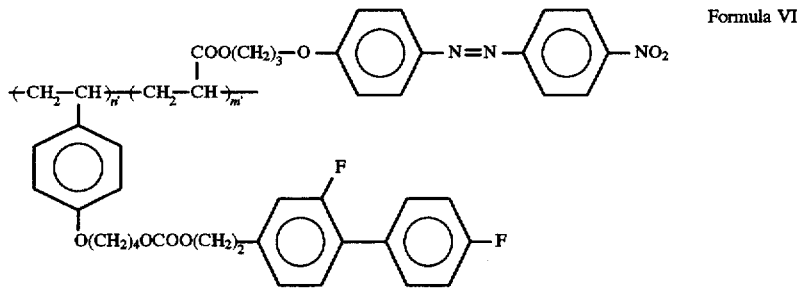

Formula VI

The ratio between the polymerizable compound (A) having the liquid crystalline functional group and the polymerizable compound (C) having the dichroic functional group was about 5. This ratio should preferably be in the range of 2 to 10 10, and more preferably be in the range of 3 to 6. If the ratio exceeds 10, the advantage of introduction of a dye molecule structure is reduced, which detracts from improvement of the contrast. On the other hand, if the ratio is smaller than 2, the dye molecule structure is excessively introduced, so that the change in color, or contrast, due to switching of an electric field decreases. Moreover, the introduction of the dye molecule may lead to deterioration of chemical stability of the liquid crystal material.

Subsequently, a 15% solution of the polymer (D) in chloroform is prepared. To this solution, a light-induced acid generating agent such as triphenyl sulfonium triflate ($Ph_3SOTf$) is added as a catalyst at a weight ratio of 5% against the whole solution. Thus, a PDLC precursor solution is obtained.

Then, as is shown in FIG. 1, the PDLC precursor solution is applied on a substrate 1, on which pixel electrodes 3 have been formed, by a bar coating method and is dried to form a PDLC precursor film having a thickness of 12 μm. The substrate 1 is composed of the same glass substrate used for the substrate 1 in Example 1.

Then, a substrate 2, on which a counter electrode 4 has been formed, is attached to the substrate 1, on which the PDLC precursor film has been formed, in such a way that the counter electrode 4 opposes the substrate 1. The resultant composite is sealed with the sealing agent 6 to form a liquid crystal panel. The substrate 2 is composed of the same glass substrate used for the substrate 2 in Example 1.

The above-mentioned liquid crystal panel is irradiated for one second with UV-rays (50 mJ/cm$^2$) and thereafter is heated for 20 minutes at 80° C. Thus, the combining group included in the PDLC precursor film cleaves, whereby the liquid crystalline functional group and the dichroic functional group are removed from the polymer (D).

By the above-described process, a PDLC layer 5 is obtained as a layer in which liquid crystal droplets 5b composed of the liquid crystalline functional group are partitioned by a polymer matrix 5a composed of the polymer consisting of the polymer (D) excluding the liquid crystalline functional group and the dichroic functional group. The PDLC layer 5 is formed in an interspace between the substrates 1 and 2. In other words, the polymer is separated from the liquid crystal and the dichroic dye by applying light and heat thereto.

The PDLC precursor film according to the fabrication method of the present example does not contain any low molecular weight compounds besides the polymerization initiator. Therefore, the problem of dissolution of unreacted low molecular weight compounds into liquid crystal droplets and dissolution of liquid crystal molecules and any dichroic dye into the polymer matrix, as associated with a conventional polymerization induced phase separation method, is reduced.

The PDLC layer 5 of the polymer dispersed liquid crystal display device in each of Example 1 and Example 2 is composed essentially of liquid crystal droplets dispersed in a polymer matrix. Therefore, the display devices of Examples 1 and 2 are capable of displaying a scattering mode.

EXAMPLE 3

The present example relates to a liquid crystal display device which is fabricated by the use of a photomask, which is used during a light irradiation step, and a method for the fabrication thereof. Hereinafter, any aggregation of liquid crystal droplets will be referred to as 'liquid crystal domains'.

Figure 3:
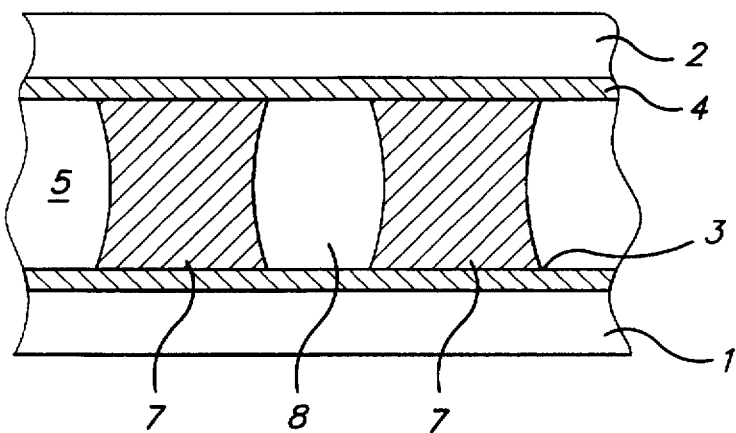
FIG. 3 is a sectional view showing a liquid crystal display device according to a second example of the present invention.

FIG. 3 is a sectional view showing the liquid crystal display device according to the present example. As is shown in FIG. 3, the liquid crystal display device includes a PDLC layer 5, which in turn includes liquid crystal domains 7 partitioned by a polymer matrix 8. Each liquid crystal domain consists of a plurality of liquid crystal droplets clustered together, and is located in a portion corresponding to a pixel electrode 3 formed on a substrate 1.

Figure 4:
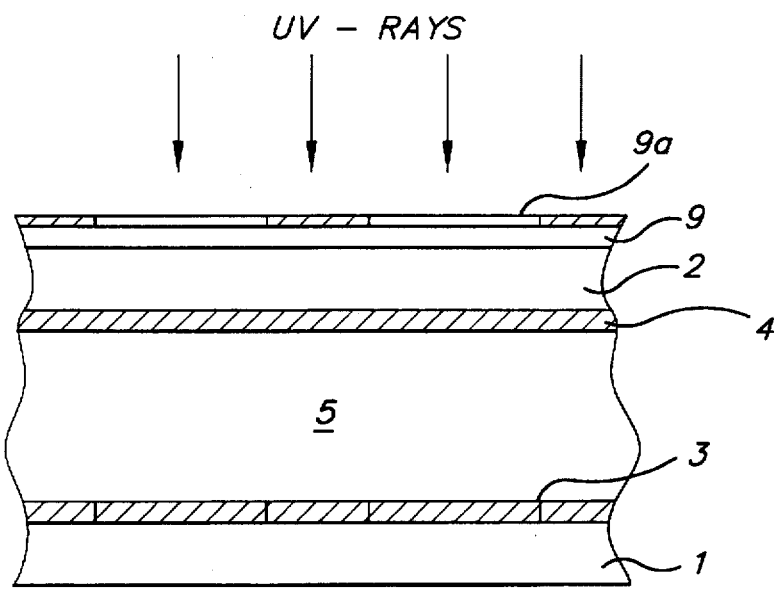
FIG. 4 is a sectional view showing how a photomask is used in the fabrication of the liquid crystal display device shown in FIG. 3.
Figure 5:
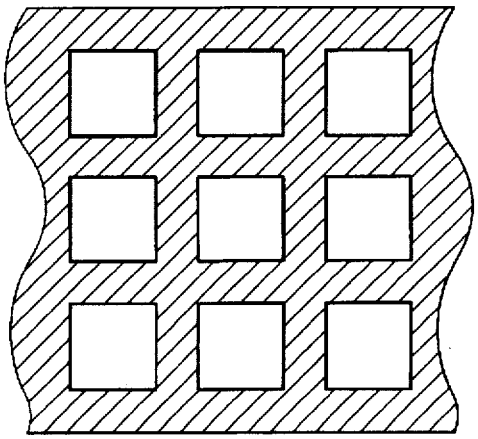
FIG. 5 is a plan view showing the photomask used in FIG. 4.

FIG. 4 schematically shows, in a cross section, the way the photomask 9 is employed in the present example. FIG. 5 is a plan view showing the photomask 9 shown in FIG. 4. The liquid crystal display device of the present example is fabricated in the following manner:

First, a liquid crystal panel is formed by using the same materials and method as those used in Example 1. Then, as is shown in FIGS. 4 and 5, the photomask 9 is disposed on a substrate 2 in such a way that each light transmitting portion (opening) 9a is located upon one of the pixel electrodes 3.

Next, as is shown in FIG. 4, the liquid crystal panel thus obtained is irradiated with UV-rays through the photomask 9 disposed on the substrate 2 under the same conditions as those in Example 1, whereby the liquid crystalline functional group is separated from the polymer (B). However, although the photomask 9 permits the liquid crystalline functional group to separate in portions of the PDLC precursor film where the UV-rays are radiated (hereinafter, such portions will be referred to as 'irradiated portions'), no separation of the liquid crystalline functional group occurs in portions of the PDLC precursor film where UV-rays are not irradiated (hereinafter, such portions will be referred to as 'non-irradiated portions'). Subsequently, therefore, the above-mentioned liquid crystal panel is heated as in Example 1 so as to effect further separation of the liquid crystalline functional group from the polymer (B) present in the irradiated portions. The liquid crystalline functional group present in the non-irradiated portions does not separate.

At the same time, liquid crystal droplets composed of the liquid crystalline functional group that has separated collectively forms liquid crystal domains 7 by contacting one another. Such contact between liquid crystal droplets is likely to begin in the irradiated portions, where the separation of the liquid crystalline functional group occurs first. As a result, the liquid crystal domains 7 are likely to be formed in the irradiated portions, that is, the portions which are not covered by the photomask 9. In the non-irradiated portions, a polymer having the liquid crystalline functional group on side chains thereof forms the polymer matrix 8.

Therefore, the fabrication method of the present example, allows the liquid crystal domains 7 to be formed in portions of the PDLC layer 5 that correspond to light transmitting portions (openings) of the photomask 9. By adjusting the size and locations of the light transmitting portions of the photomask 9, it becomes possible to control, respectively, the size and locations of the liquid crystal domains 7.

The phase transition temperature $T_{NI}$ of the PDLC layer 5 obtained in the present example was measured in the same manner as described above to be 72° C.

Figure 9A:
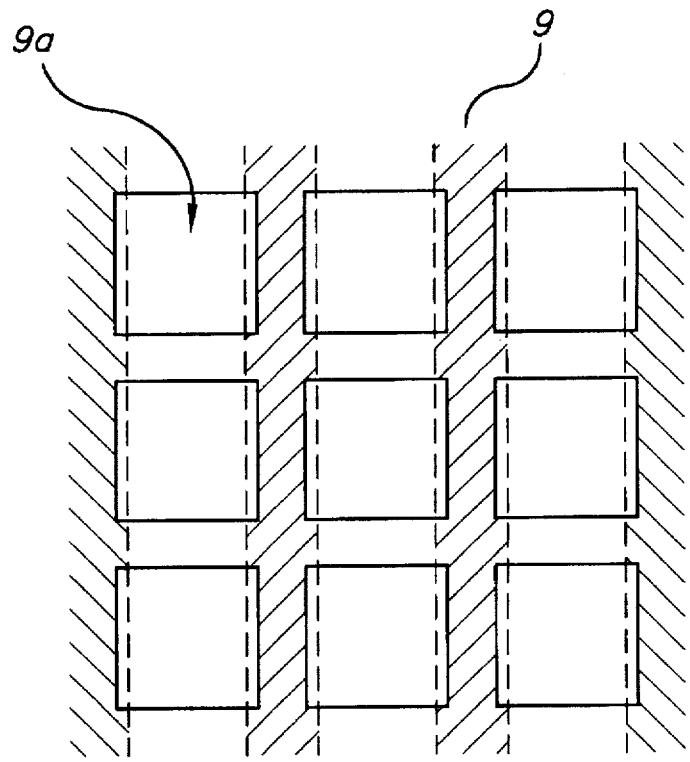
FIG. 9A is a schematic view showing an example of a photomask used in the present invention.
Figure 9B:
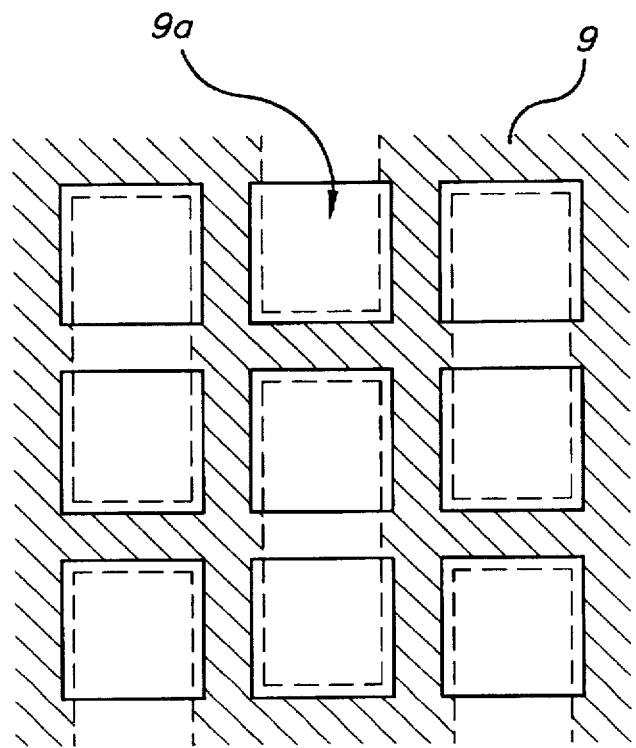
FIG. 9B is a schematic view showing an example of a photomask used in the present invention.

The photomask 9 to be used in the irradiation with light should preferably cover less than 60% of the area of each pixel region. If the photomask 9 should cover 60% or more of the area of each pixel region, it follows that the interfaces formed between the polymer matrix 8 and liquid crystal domains 7 account for 60% or more of the each pixel region; in such cases, the interfaces between the polymer matrix 8 and the liquid crystal domains 7 present in the pixel becomes a major cause for light scattering, thus decreasing the contrast of the display device. Exemplary configurations of the photomask 9 are shown in FIGS. 9A and 9B.

It is preferable that each liquid crystal domain 7 is in contact with both of the pair of opposing substrates 1 and 2, as is shown in FIG. 4.

In cases where a plurality of electrodes are provided in a matrix shape on a face of one of the substrates 1 and 2, the face being in contact with the PDLC layer 5, it is preferable that at least one of the liquid crystal domains 7 accounts for 30% or more of the area of each of 70% or more of the pixel electrodes.

The configuration of each liquid crystal domain can be, for example, a circle, a square, a trapezoid, a rectangle, a diamond shape, a letter, or a shape surrounded by a curved line(s) and/or a straight line(s). A configuration obtained by cutting a part off these shapes, a configuration obtained by combining different shapes, a configuration obtained by combining the same shape, and the like can also be used. However, the shape of each masking portion is not limited to those listed above. When the present invention is put to practical use, one or more of these shapes are to be selected. In order to improve uniformity of the liquid crystal domains and production efficiency of the liquid crystal display device, it is preferred to limit the configuration to one shape with one size.

As for the photomask, it can be formed of any material, e.g. organic, inorganic, or metal materials, as long as it can interrupt light sufficiently. In the case of an active matrix type liquid crystal display device, any wiring pattern or black mask can be used as a photomask.

Japanese Laid-Open Patent Publication No. 2-153318 discloses a method for controlling the regions where liquid crystal droplets are formed by means of a photomask. However, this method is different from the method according to the present invention in that it is not a method for controlling the shapes of liquid crystal domains.

EXAMPLE 4

In the present example, a liquid crystal display device is fabricated using the same materials and method as those used in Example 2 except that a photomask is used during the light irradiation step.

A liquid crystal panel including a PDLC precursor film is fabricated by using a polymer having on side chains thereof a liquid crystalline functional group and a dichroic dye functional group, as in Example 2. Then, as in Example 3, the liquid crystal panel is irradiated with UV-rays with the use of the photomask, and thereafter is heated to form the liquid crystal display device.

A PDLC layer of the liquid crystal display device obtained in the present example has liquid crystal domains formed in the irradiated portions, as in Example 3.

EXAMPLE 5

In the present example, a liquid crystal display device is fabricated by using a polymer further including on side chains thereof a liquid crystalline functional group capable of expression of ferroelectric liquid crystallinity (hereinafter referred to as a 'ferroelectric liquid crystalline functional group') in addition to the liquid crystalline functional group used in Example 1, and with the use of a photomask during a light irradiation step.

The liquid crystal display device is fabricated in the following manner:

An acrylate type chiral polymerizable compound (E) represented by the following Formula VII is prepared by a method described in Liquid Crystals., 9, [5], 635 (1991), for example:

Formula VII

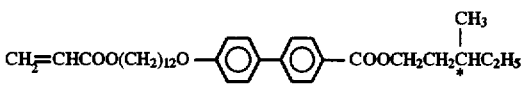

Next, the polymerizable compound (E) is reacted with the polymerizable compound (A) containing a liquid crystalline functional group as prepared in Example 1 and benzoylperoxide (BPO), which is a polymerization initiator, for eight hours in toluene at 100° C. The resultant material is repeatedly subjected to a precipitation process in methanol to remove low molecular weight compounds. Thus, a polymer (F) having the liquid crystalline functional group is obtained, which is represented by the following Formula VIII:

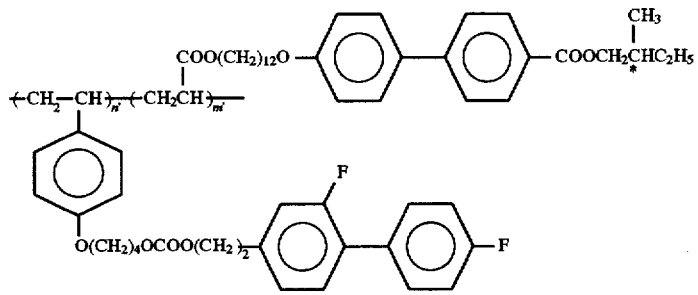

Formula VIII

The ratio between the polymerizable compound (A) having the liquid crystalline functional group and the polymerizable compound (E) having the ferroelectric liquid crystalline functional group was 1. This ratio should preferably be in the range of 0.2 to 2. If the ratio exceeds 2, the liquid crystal material does not show a SmC* phase, so that ferroelectric switching does not occur. On the other hand, if the ratio is smaller than 0.2, the reaction rate of the polymerization reaction lowers, which results in a decrease in the yield. Moreover, the advantage of enhancement of shock resistance is reduced.

Subsequently, a 15% solution of the polymer (F) in chloroform is prepared. To this solution, a light-induced acid generating agent such as triphenyl sulfonium triflate ($Ph_3SOTf$) is added as a catalyst at a weight ratio of 5% against the whole solution. Thus, a PDLC precursor solution is obtained.

Then, as is described in Example 1, the PDLC precursor solution is applied on a substrate 1, on which pixel electrodes 3 have been formed, by a bar coating method and is dried to form a PDLC precursor film having a thickness of 12 μm. The substrate 1 is composed of the same glass substrate used for the substrate 1 in Example 1.

Then, a substrate 2, on which a counter electrode 4 has been formed, is attached to the substrate 1, on which the PDLC precursor film has been formed, in such a way that the counter electrode 4 opposes the substrate 1. The resultant composite is sealed with the sealing agent 6 to form a liquid crystal panel. The substrate 2 is composed of the same glass substrate used for the substrate 2 in Example 1.

As in Example 3, the above-mentioned liquid crystal panel is irradiated with UV-rays (80 mJ/cm$^2$) by using a high-pressure mercury lamp and a photomask placed over the substrate 2 and thereafter is heated for 20 minutes at 80° C. Thus, the liquid crystalline functional group and the ferroelectric liquid crystalline functional group are separated from the polymer (F). A PDLC layer of the liquid crystal display device fabricated in the present example is of a configuration such that liquid crystal domains containing ferroelectric liquid crystal are formed in the irradiated portions, as in the case of Example 3 and 4.

A conventional ferroelectric liquid crystal display device is known to have memory functions and rapid response. However, since a conventional ferroelectric liquid crystal display device utilizes a chiral smectic C (SmC*) phase, at which the liquid crystal is closer to being a crystal than at a nematic phase, it has the problem that the phase order thereof is likely to be damaged by receiving a shock or stress. On the other hand, the polymer matrix of a polymer dispersed liquid crystal display device according to the present invention is made flexible because it is not cross-linked, in contrast to that of a conventional polymer dispersed liquid crystal display device which is fabricated utilizing polymerization induced phase separation. Therefore, the PDLC layer and the substrates, according to the present invention, have a high adhesion to each other; moreover, the liquid crystal droplets are prevented from being stressed. As a result, the problem of poor shock resistance or stress resistance, as associated with a conventional ferroelectric liquid crystal display device, is minimized according to the invention.

Although a conventional ferroelectric liquid crystal display device has the problem that it cannot conduct display in gray scales, a polymer dispersed liquid crystal display device according to the present example can display gray scales by forming a plurality of liquid crystal domains in a single pixel with the use of a photomask and by suitably controlling the display areas.

EXAMPLE 6

In the present example, a liquid crystal display device is fabricated by using substrates each provided with an aligning film, and with the use of a photomask during a light irradiation step.

The liquid crystal display device of the present example is fabricated in the following manner:

Polyimide (SE150, manufactured by Nissan Chemical Industries Ltd.) is applied on a substrate 1 provided with pixel electrodes 3 and a substrate 2 provided with a counter electrode 4 by spin coating. Each of the resultant polyimide films is subjected to a rubbing treatment in one direction (hereinafter referred to as a 'rubbing direction') so as to form an aligning film.

Then, as in Example 3, a PDLC precursor solution is applied on the substrate 1 and is dried to form a PDLC precursor film. Thereafter, the substrates 1 and 2 are attached to each other in such a way that the rubbing direction for the substrate 1 is inverse to that for the substrate 2 to form a liquid crystal pane. The resultant liquid crystal panel is irradiated with UV-rays by using a photomask, as in Example 3, and then is heated. A PDLC layer of the liquid crystal display device fabricated in the above-mentioned manner is of a configuration such that liquid crystal domains are formed in the irradiated portions, as in the case of Example 3, 4 and 5.

Figure 7:
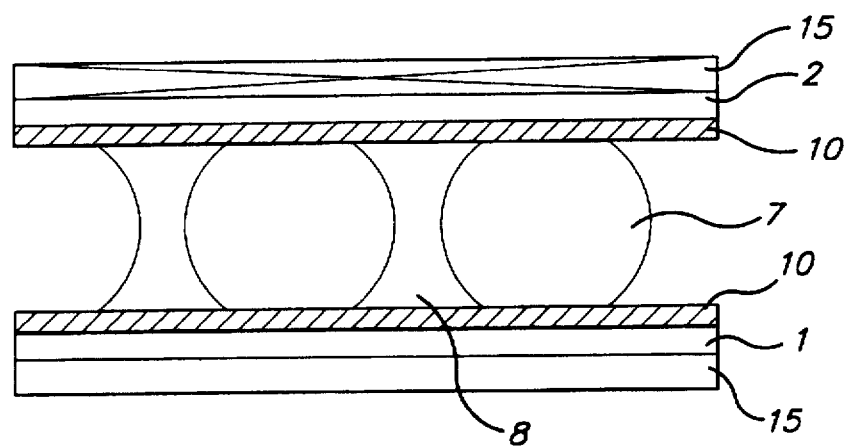
FIG. 7 is a sectional view showing a liquid crystal display device according to a sixth example of the present invention.

FIG. 7 shows a cross section of the liquid crystal display device of the present example. As is shown in FIG. 7, the liquid crystal display device includes polarizing plates disposed on the substrates 1 and 2. The two polarizing plates are disposed perpendicular to each other, thus forming a so-called crossed-Nicol state.

Figure 6:
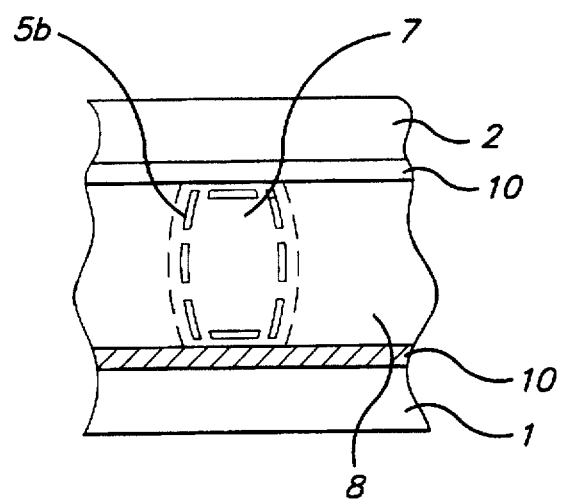
FIG. 6 is a sectional view showing a polymer dispersed liquid crystal formed in a liquid crystal display device according to a sixth example of the present invention.

FIG. 6 shows a cross section of a PDLC layer of the liquid crystal display device of the present example. The configuration shown in FIG. 6 was confirmed to be present by observing a cross section of the PDLC layer of the liquid crystal display device by using a polarizing microscope. As is shown in FIG. 6, the PDLC layer includes a liquid crystal domain 7 composed essentially of liquid crystal droplets 5b. Liquid crystal molecules included in the liquid crystal droplets 5b which are adjacent to a polymer matrix 8 are aligned along the interface between the liquid crystal domain 7 and the polymer matrix 8. On the other hand, liquid crystal molecules included in the liquid crystal droplets 5b which are adjacent to the aligning films 10 are aligned in parallel to the rubbing directions for the aligning films 10.

The polymer dispersed liquid crystal display devices of Examples 3 to 6 are so configured that the liquid crystal domains thereof are formed with a predetermined regularity in the irradiated portions provided by means of a photomask. Therefore, the liquid crystal display devices can be utilized as non-scattering mode liquid crystal display devices, in which polarizing plates disposed in a crossed-Nicol state are used. In particular, a liquid crystal display device in which the orientations of the liquid crystal are controlled in a manner shown in FIG. 6 can prove to be an excellent non-scattering mode liquid crystal display device with high viewing characteristics. In addition, a liquid crystal display device fabricated by using a photomask has the advantage that the liquid crystal droplets thereof have uniform distribution of sizes. Therefore, such a liquid crystal display device, utilized as a non-scattering mode liquid crystal display device, has steeper threshold value characteristics.

EXAMPLE 7

In the present example, a liquid crystal display device is fabricated by using substrates 1 and 2 each provided with an aligning film as in Example 6, and the radiating light on the whole area of a PDLC precursor film without using a photomask, in contrast to Example 6.

The PDLC layer of the liquid crystal display device of the present example includes liquid crystal droplets dispersed in a polymer matrix, as in the case of the PDLC layer of the liquid crystal display device of Example 1. However, unlike Example 1, aligning films are formed on the faces of the substrates 1 and 2 which are in contact with the PDLC layer. The liquid crystal display device of the present example is of a scattering mode which does not require polarizing plates.

COMPARATIVE EXAMPLES 1 AND 2

In each of Comparative Examples 1 and 2, a liquid crystal display device is fabricated by using a conventional photopolymerization induced phase separation method. First, the liquid crystal display device of Comparative Example 1 will be described.

First, pixel electrodes 4 are formed on a substrate 1 similar to the substrate 1 of Example 1. A counter electrode 4 is formed on a substrate 2 similar to the substrate 2 of Example 1. Than, the substrates 1 and 2 are attached to each other with spacers interposed therebetween in such a way that the counter electrode 4 and each of the pixel electrodes 3 oppose each other.

Next, a homogeneous mixture of a photopolymerizable compound consisting of 0.02 g of a bifunctional acrylate monomer (R-684, manufactured by Nippon Kayaku K.K.) and 0.17 g of 2-ethylhexylacrylate; 0.78 g of liquid crystal material (ZLI-4792, manufactured by Merck & Co., Inc.), and 0.03 g of a polymerization initiator (Irgacure 651, manufactured by CIBA-GEIGY Corporation) is prepared. The mixture is injected as a PDLC precursor into the interspace between the substrates 1 and 2.

Next, the PDLC precursor is irradiated with UV-rays by using a high-pressure mercury lamp at an illuminance of 50 mW/cm$^2$ (at 365 nm; measured by UIT-101; a UV illuminometer manufactured by USHIO INC.) for 60 seconds (3 J/cm$^2$). As the polymerizable compound is polymerized by the UV-ray irradiation, the liquid crystal and the polymer phase separate. Thus, a liquid crystal display device has been obtained with a PDLC layer interposed between the substrates 1 and 2.

The liquid crystal display device of Comparative Example 2 is fabricated by using the same materials as those in Comparative Example 1 and by radiating UV-rays with the use of a photomask as in Example 3, etc.

Table 1 shows evaluation results of electrooptical characteristics (voltage-transmittance characteristics) of the liquid crystal display devices of Examples 1 to 7 and Comparative Examples 1 and 2. More specifically, the evaluation was conducted based on measurements of a change in light transmittance at room temperature of the liquid crystal display device when no voltage is applied and when a voltage is applied. A halogen lamp was used as a light source. The collection angle at an optical detector used in the measurement was 6°.

In Table 1, $T_s$ denotes a light transmittance (saturation transmittance) when an excess voltage was applied to each liquid crystal display device. $T_0$ denotes a light transmittance when no voltage is applied to the liquid crystal display device. $V_{th}$ denotes a threshold voltage, at which the relative light transmittance (defined below) of the liquid crystal display device reaches 10%. $V_s$ denotes a saturation voltage, at which the relative light transmittance of the liquid crystal display device reaches 90%. Herein, the light transmittance $T_O$ of each liquid crystal display device is defined as a relative light transmittance of 0%, while the light transmittance $T_s$ of the same liquid crystal display device is defined as a relative light transmittance of 100%. $T_{100}$ denotes the light transmittance when an alternating voltage of 50 V is applied to the liquid crystal display device. $V_{th}'$ denotes the threshold voltage of the liquid crystal display device after being heated for two hours at 60° C. In the measurements of light transmittances of the liquid crystal display devices of Examples 5 and 6, it is assumed that a pair of polarizing plates disposed in a crossed-Nicol state has, as a whole, a light transmittance of 0%, and that the same polarizing plates disposed in a parallel-Nicol state have as a whole a light transmittance of 100%.

TABLE 1

| | $T_0$ (%) | $T_{100}$ (%) | $V_{th}$ (V) | $V_s$ (V) | $V_{th}'$ (V) |
|---|---|---|---|---|---|
| Example 1 | 2.1 | 70.7 | 6.8 | 10.1 | 7.1 |
| Example 2 | 0.9 | 65.3 | 9.3 | 12.3 | 13.8 |
| Example 3 | 1.8 | 71.3 | 6.6 | 8.9 | 7.0 |
| Example 4 | 0.9 | 66.1 | 9.4 | 11.7 | 13.2 |
| Example 5 | 1.3 | 65.3 | 7.4 | 11.3 | 13.1 |
| Example 6 | 1.6 | 72.0 | 6.6 | 8.5 | 6.7 |
| Example 7 | 1.9 | 70.9 | 6.7 | 9.7 | 7.4 |
| Comparative Example 1 | 6.8 | 73.0 | 6.6 | 8.8 | 17.1 |
| Comparative Example 2 | 6.6 | 72.7 | 6.5 | 8.0 | 16.3 |

As will be understood from Table 1, the light transmittance $T_O$ (under no voltage applied) of the liquid crystal display device of Examples 1 to 7 are sufficiently low. In addition, the threshold voltages $V_{th}'$ of these liquid crystal display devices (after being heated) have only a small difference from the initial threshold voltages $V_{th}$ thereof, which is indicative of high heat resistance. Each of the liquid crystal display devices of Examples 3, 4 and 6, which were fabricated by using photomasks, is characterized by the small difference between its saturation voltage $V_s$ and threshold voltage $V_{th}$, as compared with those of the liquid crystal display devices of Examples 1, 2 and 7, which were fabricated without using photomasks. This fact indicates that the liquid crystal display devices which were fabricated with photomasks generally have steep electrooptical characteristics. Moreover, the liquid crystal display devices which were fabricated by using photomasks have lower threshold voltages $V_{th}$ and lower saturation voltages $V_s$. On the other hand, the light transmittances $T_0$ (under no voltage applied) of the liquid crystal display devices of Comparative Examples 1 and 2 are remarkably high as compared with those of the liquid crystal display device of Examples 1 to 7. In addition, the threshold voltages $V_{th}$, of the liquid crystal display devices of Comparative Examples 1 and 2 (after being heated) have a large difference from the initial threshold voltages $V_{th}$ thereof, which is indicative of poor heat resistance.

Table 2 shows measurement results of contrast ratios of the liquid crystal display devices of Examples 1 to 4. The liquid transmittance $T_0$ (under no voltage applied) and the light transmittance $T_s$ (under an excess voltage applied) of each liquid crystal display device were measured by using a halogen lamp and a He-Ne laser alternately as a light source. A ratio $T_s/T_O$ measured by using the halogen lamp as the light source is defined as a contrast ratio $CR_1$; a ratio $T_s/T_O$ measured by using the He-Ne laser as the light source is defined as a contrast ratio $CR_2$.

TABLE 2

|  | $CR_1$ | $CR_2$ |
| --- | --- | --- |
| Example 1 | 33.7 | 26.4 |
| Example 2 | 72.6 | 58.7 |
| Example 3 | 39.6 | 28.6 |
| Example 4 | 73.4 | 59.8 |

As will be understood from Table 2, the liquid crystal display devices of Examples 2 and 4, each of which includes a dichroic functional group, have a high contrast as compared with the liquid crystal display devices of Examples 1 and 3, which do not include the dichroic functional group. Moreover, the problem of dissolution of dye molecules into the polymer matrix, as associated with a conventional guest-host type polymer dispersed liquid crystal display device, is restrained in the liquid crystal display devices of Examples 2 and 4.

The dichroic functional group to be used should preferably be such that the dichroic ratio of the dichroic dye is 4 or more. Examples of such functional groups include azo-type dyes and anthraquinone-type dyes as well as p-ω-hydroxypropyloxy-p'-nitroazobenzene used in Examples 2 and 4 of the present invention. Examples of suitable functional groups other than dichroic functional groups include functional groups capable of color expression when isomerized, i.e. when the molecular structure is changed, by absorbing light energy; functional groups of a spiropyrane-type, fulgide-type, diallylethene-type, azobenzen-type, and the like. By using any of the above-mentioned dichroic functional groups and functional groups capable of color expression, the contrast of the liquid crystal display device can be improved due to a light absorption effect, and/or a color display can be achieved.

There has been proposed a liquid crystal display device having a composite of polymer liquid crystal, low molecular weight liquid crystal, and photoresponsive molecules (cf. Preprints of 16th Symposium on Liquid Crystals, Japan, p./45 (1990)). This liquid crystal display device is characterized by its capability of memorizing the different states obtained by applying a low frequency electric field and a high frequency electric field to the liquid crystal display device. The operational principle and fabrication method of this liquid crystal display device are different from those of the liquid crystal display device according to the present invention.

EXAMPLE 8

The present invention relates to a liquid crystal display device fabricated by utilizing a heat induced cleavage reaction and a fabrication method for such a liquid crystal display device.

The liquid crystal display device of the present invention is fabricated in the following manner:

First, the polymerizable compound (A) used in Example 1 is reacted with azobisisobutyronitryl (AIBN) for six hours in toluene at 100° C. The resultant material is repeatedly subjected to a precipitation process in methanol to remove low molecular weight compounds. Thus, the polymer (B) in Example 1 is obtained.

Subsequently, a 15% solution of the polymer (B) in chloroform is prepared. To this solution, an polymerization initiator based on a mixture of benzoylperoxide (BPO), which is a redox acid generating agent, and dimethylaniline is added at a weight ratio of 5% against the whole solution. Thus, a PDLC precursor solution is obtained. Then, a liquid crystal panel is fabricated in the same manner as in Example 1.

The resultant liquid crystal panel is heated for six hours at 60° C. so as to hydrolyze the combining group. Thus, the liquid crystal functional group is separated from the polymer (B). As a result, a PDLC layer 5 composed essentially of liquid crystal droplets dispersed in a polymer matrix is formed in an interspace between substrates 1 and 2.

The cleavage of the combining group is conducted by applying heat to the liquid crystal panel in the present example. A desired liquid crystal display device can also be obtained by this method as well as methods in which light are applied, and methods in which light and heat are applied.

In the above-described Examples 1, 3 and 6 to 8, p-hydroxystyrene is used as the polymer material. In Examples 2, 4 and 5, p-hydroxystyrene and acrylic acid chloride are used as the polymer material. However, the present invention accepts polymer material having structures such as those of a polyacrylate type, polymethacrylate type, polyethylene type, polypropylene type, polycarbonate type, polyvinyl chloride type, polyvinylidene fluoride type, polystyrene type, polyphenylene oxide type, polysulfone type, polyamide type, polyurethane type, polyethylene-terephthalate type, phenol resin type, epoxy resin type, and polyimide type.

As for the polymer material to be used, those which are highly stabile against heat and have high electric resistance are preferable. The polymer material should preferably be adequately purified to be used in, in particular, an active matrix type liquid crystal display device.

Although 1-bromo-4-butanol is used for the combining group in the examples of the present invention, general material which cleaves by the use of light and/or heat may alternatively be used. Examples of such materials include silyl-type compounds, siloxane-type compounds, ester-type compounds, ether-type compounds, and amide-type compounds which can cleave by the use of light, heat, acids, and/or alkaline materials.

Although triphenyl sulfonium triflate (Ph₃SOTf), a polymerization initiator based on a mixture of benzoylperoxide (BPO) and dimethylaniline are used as catalysts in the examples of the present invention, a light induced acid generating agent such as an onium salt, a redox acid generating agent, and the like may alternatively be used. Any catalyst used in the present invention is employed for a cleavage reaction of a combining group included in a polymer, which is conducted with the use of light and/or heat.

As will be apparent from the above description, the present invention provides a liquid crystal display device having excellent display characteristics by preventing deterioration of the display characteristics due to dissolution of unreacted polymer material into the liquid crystal, which is a problem associated with a conventional method for a liquid crystal display device. The present invention also provides a highly reliable liquid crystal display device in which change in the display characteristics is restrained. Furthermore, the present invention is applicable to liquid crystal display devices of display modes other than the scattering mode.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of opposing substrates and polymer dispersed liquid crystal interposed between the pair of opposing substrates, the polymer dispersed liquid crystal including a polymer matrix and a plurality of liquid crystal droplets partitioned by the polymer matrix, wherein the polymer matrix and the plurality of liquid crystal droplets are formed by applying radiation to a polymer dispersed liquid crystal precursor in which a polymer for forming the polymer matrix and liquid crystal molecules for forming the liquid crystal droplets are combined via a cleavable linking group said linking group selected from the group consisting of a silyl compound, a siloxane compound, an alcohol compound, an ester compound, an ether compound and an amide compound, the cleavable linking group being cleaved by the application of the radiation, the radiation being at least one of light and heat.

2. A liquid crystal display device according to claim 1, wherein the polymer dispersed liquid crystal includes a plurality of liquid crystal domain consisting essentially of liquid crystal droplets.

3. A liquid crystal display device according to claim 2, wherein each liquid crystal domain is in contact with both of the pair of opposing substrates.

4. A liquid crystal display device according to claim 3 further comprising a plurality of electrodes disposed in a matrix shape on a face of one of the pair of opposing substrates, the face being in contact with the polymer dispersed liquid crystal, wherein at least one of the liquid crystal domains accounts for 30% or more of the area of each of 70% or more of the pixel electrodes.

5. A liquid crystal display device according to claim 3, wherein an aligning film is formed on at least one face of the pair of opposing substrates, the face being in contact with the polymer dispersed liquid crystal.

6. A liquid crystal display device according to claim 3, wherein the liquid crystal droplets include at least one dichroic dye having a dichroic ratio or no less than 4.

7. A liquid crystal display device according to claim 1, wherein the liquid crystal droplets include at least one chromophore, the chromophore being isomerized by applying the radiation thereto.

8. A method for producing a liquid crystal display device comprising a pair of opposing substrates and polymer dispersed liquid crystal interposed between the pair of opposing substrates, the polymer dispersed liquid crystal including a polymer matrix and a plurality of liquid crystal droplets partitioned by the polymer matrix, the method comprising the steps of:

forming a polymer dispersed liquid crystal precursor in which a polymer for forming the polymer matrix and liquid crystal molecules for forming the liquid crystal droplets are combined via a cleavable linking group cleavable by the application of radiation on one of the pair of opposing substrates, the radiation being one of light and heat;

attaching the other one of the pair of opposing substrates to the polymer dispersed liquid crystal precursor formed on the one substrate; and irradiating portions of the polymer dispersed liquid crystal with light, the combining group present in irradiated portions of the polymer dispersed liquid crystal precursor being cleaved by the irradiation.

9. A method according to claim 8 further comprising a step of heating the polymer dispersed liquid crystal precursor after the step of irradiation with light, the cleavable linking group present in non-irradiated portions of the polymer dispersed liquid crystal precursor being cleaved by the heating.

10. A method according to claim 8, wherein the step of irradiation with light is a step of controlling the irradiated portions of the polymer dispersed liquid crystal precursor by means of a photomask.

11. A method according to claim 10 further comprising a step of forming a plurality of electrodes disposed in a matrix shape on a face of one of the pair of opposing substrates, the face being in contact with the polymer dispersed liquid crystal, wherein a total area of openings of the photomask accounts for more than 40% of a total area of the plurality of pixel electrodes.

12. A method according to claim 10 further comprising a step of forming an aligning film on at least one of faces of the pair of opposing substrates, the faces being in contact with the polymer dispersed liquid crystal.

13. A method according to claim 8, wherein the light used in the step of irradiation is no less than 200 mJ/cm².

14. A method for producing a liquid crystal display device comprising a pair of opposing substrates and polymer dispersed liquid crystal interposed between the pair of opposing substrates, the polymer dispersed liquid crystal including a polymer matrix and a plurality of liquid crystal droplets partitioned by the polymer matrix, wherein the method comprises the steps of:

forming a polymer dispersed liquid crystal precursor in which a polymer for forming the polymer matrix and liquid crystal molecules for forming the liquid crystal droplets are combined via a cleavable linking group cleavable by the application of radiation on one of the pair of opposing substrates, the radiation being at least one of light and heat;

attaching the other one of the pair of opposing substrates to the polymer dispersed liquid crystal precursor formed on the one substrate; and cleaving the combining group by applying the radiation to the polymer dispersed liquid crystal precursor.

15. A method according to claim 14, wherein the polymer dispersed liquid crystal precursor further includes a dichroic dye via a cleavable linking group cleavable by applying light and/or heat thereto, the dichroic dye having a dichroic ratio of no less than 4.

16. A method according to claim 14, wherein the polymer dispersed liquid crystal precursor further includes, via a cleavable linking group cleavable by applying the radiation thereto, a liquid crystalline functional group and a functional group capable of color expression and isomerizable by applying the radiation thereto.

* * * * *